(12) United States Patent
Ferris et al.

(10) Patent No.: US 8,947,819 B1
(45) Date of Patent: *Feb. 3, 2015

(54) DISK DRIVE IMPLEMENTING HYSTERESIS FOR PRIMARY SHOCK DETECTOR BASED ON A MORE SENSITIVE SECONDARY SHOCK DETECTOR

(71) Applicant: Western Digital Technologies, Inc., Irvine, CA (US)

(72) Inventors: Timothy A. Ferris, Mission Viejo, CA (US); Alain Chahwan, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/054,738

(22) Filed: Oct. 15, 2013

Related U.S. Application Data

(60) Provisional application No. 61/871,279, filed on Aug. 28, 2013.

(51) Int. Cl.
  *G11B 27/36* (2006.01)
  *G11B 15/04* (2006.01)
  *G11B 19/04* (2006.01)

(52) U.S. Cl.
  CPC .................................. *G11B 19/042* (2013.01)
  USPC .................................. 360/60; 360/31; 360/75

(58) Field of Classification Search
  CPC .................................................. G11B 5/59694
  See application file for complete search history.

(56) References Cited

U.S. PATENT DOCUMENTS

| | | |
|---|---|---|
| 5,663,847 A | 9/1997 | Abramovitch |
| 6,011,415 A | 1/2000 | Hahn et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,115,200 A | 9/2000 | Allen et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |

(Continued)

OTHER PUBLICATIONS

Alain Chahwa, et. al., U.S. Appl. No. 13/451,373, filed Apr. 19, 2012, 15 pages.

(Continued)

*Primary Examiner* — Daniell L Negron

(57) ABSTRACT

A disk drive is disclosed comprising a head actuated over a disk, and control circuitry comprising a first shock detector and a second shock detector. A first number of shock events is detected based on the first shock detector, and when the first number of shock events exceeds an upper event threshold, a sensitivity of the first shock detector is decreased. After decreasing the sensitivity of the first shock detector, a second number of shock events is detected based on the second shock detector operating at a higher sensitivity than the first shock detector. When the second number of shock events falls below a lower event threshold, the sensitivity of the first shock detector is increased.

20 Claims, 4 Drawing Sheets

(56) References Cited

U.S. PATENT DOCUMENTS

| | | |
|---|---|---|
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,215,608 B1 | 4/2001 | Serrano et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,414,813 B2 | 7/2002 | Cvancara |
| 6,429,990 B2 | 8/2002 | Serrano et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,320 B1 | 12/2002 | Liu |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,717,757 B1 | 4/2004 | Levy et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,262 B1 | 9/2004 | Codilian et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,958,882 B2 | 10/2005 | Kisaka |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,154,690 B1 | 12/2006 | Brunnett et al. |
| 7,158,329 B1 | 1/2007 | Ryan |
| 7,177,106 B2 | 2/2007 | Inaji et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,982 B1 | 8/2007 | Brunnett et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |

(56) References Cited

U.S. PATENT DOCUMENTS

| | | |
|---|---|---|
| 7,333,282 B2 | 2/2008 | Iseri et al. |
| 7,333,290 B1 | 2/2008 | Kupferman |
| 7,339,761 B1 | 3/2008 | Tu et al. |
| 7,345,841 B2 | 3/2008 | Baugh et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,471,483 B1 | 12/2008 | Ferris et al. |
| 7,474,491 B2 | 1/2009 | Liikanen et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,545,593 B1 | 6/2009 | Sun et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,698 B2 | 12/2009 | Finamore et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,826,163 B2 | 11/2010 | Harmer et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 * | 12/2010 | Ferris et al. .................. 360/60 |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,375,767 B2 | 2/2013 | Zadesky et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |

(56) References Cited

U.S. PATENT DOCUMENTS

| | | |
|---|---|---|
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2010/0035085 A1 | 2/2010 | Jung et al. |
| 2012/0284493 A1 | 11/2012 | Lou et al. |
| 2013/0114162 A1 | 5/2013 | Zhang et al. |
| 2013/0120870 A1 | 5/2013 | Zhou et al. |
| 2013/0148240 A1 | 6/2013 | Ferris et al. |

OTHER PUBLICATIONS

Daniel J. Gunderson, et. al., U.S. Appl. No. 13/246,600, filed Sep. 27, 2011, 17 pages.

Kuang-Yang Tu, et. al., U.S. Appl. No. 13/668,142, filed Jun. 25, 2013, 15 pages.

Xu Chen, et. al., U.S. Appl. No. 13/668,142, filed Nov. 12, 2012, 14 pages.

\* cited by examiner

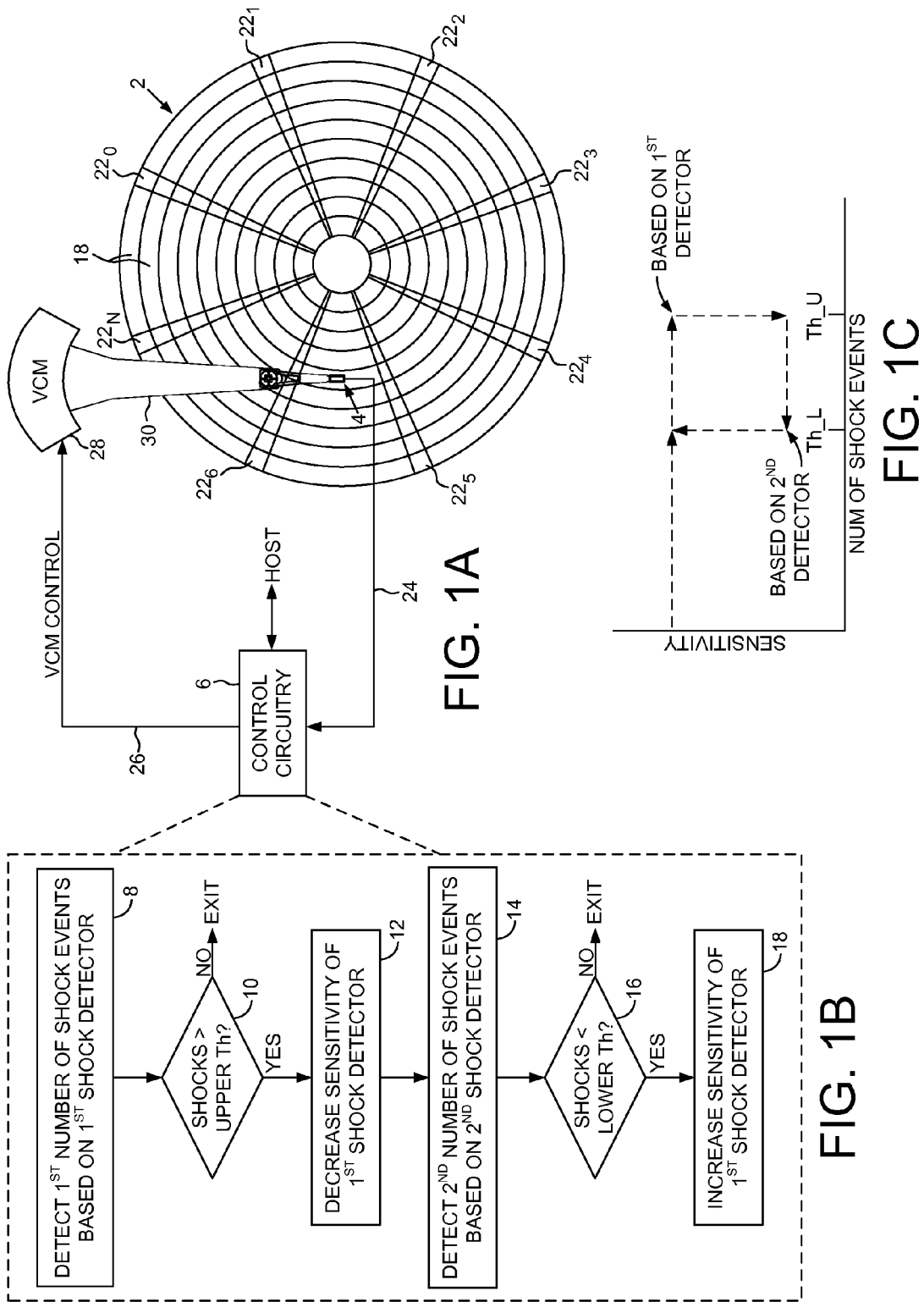

DISK DRIVE IMPLEMENTING HYSTERESIS FOR PRIMARY SHOCK DETECTOR BASED ON A MORE SENSITIVE SECONDARY SHOCK DETECTOR

CROSS-REFERENCE TO RELATED APPLICATIONS

This application claims priority to provisional U.S. Patent Application Ser. No. 61/871,279, filed on Aug. 28, 2012, which is hereby incorporated by reference in its entirety.

BACKGROUND

A disk drive comprises a disk rotated by a spindle motor, and a head connected to a distal end of an actuator arm which is rotated about a pivot by a voice coil motor (VCM) to position the head radially over the disk. The disk comprises a number of concentric data tracks each partitioned into a number of data sectors. Access operations are performed by seeking the head to a target data track, and performing a write/read operation on the data sectors within the data track. The disk comprises embedded servo sectors having position information recorded therein, such as coarse position information (e.g., a track address) and fine position information (e.g., servo bursts). Control circuitry processes the read signal emanating from the head in order to demodulate the servo sectors into a control signal applied to the VCM in order to position the head over the target data track.

Physical shocks to the disk drive may cause the head to deviate from the target track and corrupt data recorded in an adjacent track during a write operation. Therefore, if a physical shock is detected using a suitable sensor (e.g., an accelerometer), the write operation is typically aborted and then retried. However, the system noise (electrical and/or mechanical) may excite a resonant frequency of the shock sensor which can trigger a false shock detection, thereby degrading the performance of the disk drive due to the unnecessary slipped disk revolutions.

BRIEF DESCRIPTION OF THE DRAWINGS

FIG. 1A shows a disk drive according to an embodiment comprising a head actuated over a disk.

FIG. 1B is a flow diagram according to an embodiment wherein a second shock detector provides hysteresis when adjusting a sensitivity of a first shock detector.

FIG. 1C illustrates an example embodiment wherein a sensitivity of a first shock detector is adjusted based on a number of shock events detected by a second shock detector.

DETAILED DESCRIPTION

Figure 2A:
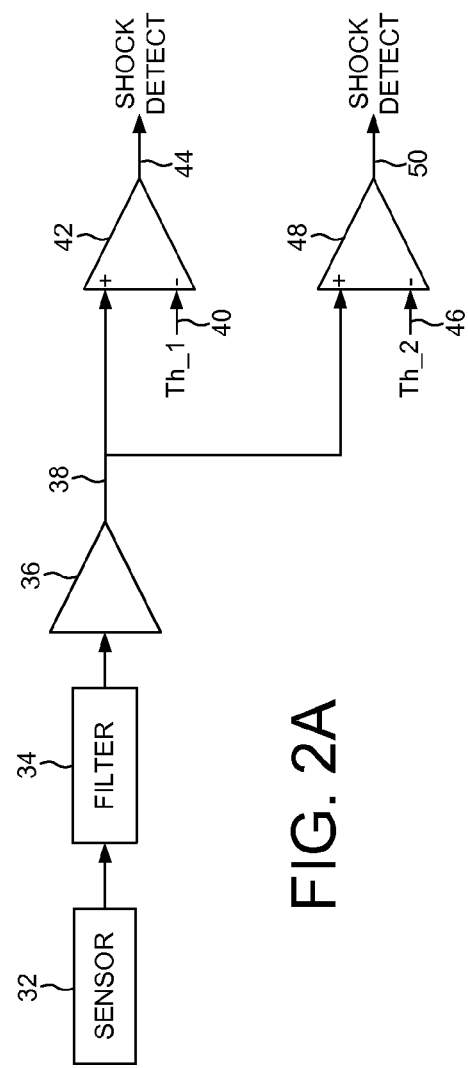
FIG. 2A shows control circuitry for implementing a first shock detector and a second shock detector according to an embodiment.

FIG. 1A shows a disk drive according to an embodiment comprising a disk 2, a head 4 actuated over the disk 2, and control circuitry 6 comprising a first shock detector and a second shock detector. The control circuitry 6 is operable to execute the flow diagram of FIG. 1B which is understood with reference to the example of FIG. 1C, wherein a first number of shock events is detected based on the first shock detector (block 8), and when the first number of shock events exceeds an upper event threshold (block 10), a sensitivity of the first shock detector is decreased (block 12). After decreasing the sensitivity of the first shock detector, a second number of shock events is detected based on the second shock detector operating at a higher sensitivity than the first shock detector (block 14), and when the second number of shock events falls below a lower event threshold (block 16), the sensitivity of the first shock detector is increased (block 18).

In the embodiment of FIG. 1A, the disk 2 comprises servo tracks 18 defined by servo sectors $22_0$-$22_N$, wherein data tracks are defined relative to the servo tracks 18 at the same or different radial density. The control circuitry 6 processes a read signal 24 emanating from the head 4 to demodulate the servo sectors $22_0$-$22_N$ and generate a position error signal (PES) representing an error between the actual position of the head and a target position relative to a target track. The control circuitry 6 filters the PES using a suitable compensation filter to generate a control signal 26 applied to a voice coil motor (VCM) 28 which rotates an actuator arm 30 about a pivot in order to actuate the head 4 radially over the disk 2 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the control circuitry 6 may abort a write operation to the disk when a shock event is detected so as to avoid corrupting data in adjacent tracks due to an off-track write. An example shock event detector is illustrated in FIG. 2A as comprising a suitable sensor 32 (e.g., an accelerometer) for generating a sensor signal that is filtered 34 and then amplified 36 to generate a shock signal 38. When the shock signal 38 exceeds a first shock threshold 40 at comparator 42, a shock event 44 is detected which may be used to abort a write operation. In this embodiment, the first shock threshold 40 and comparator 42 may constitute a first shock detector for detecting the shock event 44. If a sensitivity of the first shock detector is too high, an excessive number of false shock events may be detected which can degrade the performance of the disk drive due to the slipped revolutions required to retry the aborted write operations. Accordingly, in one embodiment when the number of shock events detected by the first shock detector over a predetermined interval exceeds an upper event threshold as illustrated in FIG. 1C, a sensitivity of the first shock detector is decreased so as to decrease the number of shock events detected. The sensitivity of the first shock detector may be decreased in any suitable manner, such as by increasing the first shock threshold 40, thereby reducing the number of shock events 44 detected.

In one embodiment, a hysteresis in the sensitivity of the first shock detector is implemented by employing a second shock detector having a higher sensitivity than the first shock detector. In the embodiment of FIG. 2A, the second shock detector comprises a second shock threshold 46 and a second comparator 48, wherein the second shock threshold 46 may be lower than the first shock threshold 40. Accordingly, the second shock detector will detect more shock events 50 than the first shock detector. When the number of shock events 50 detected by the second shock detector falls below a lower event threshold, the sensitivity of the first shock detector is increased, for example, by decreasing the first shock threshold 40. Accordingly, in this embodiment the second shock detector ensures the average amplitude of the shock signal 38 has truly decreased before increasing the sensitivity of the first shock detector, thereby avoiding the undesirable situation where the sensitivity of the first shock detector toggles between a lower and higher sensitivity.

In one embodiment, the sensitivity of the first shock detector may vary between different levels so as to tune the sensitivity based on the average amplitude of the shock signal 38. That is, as the average amplitude of the shock signal 38 increases, for example, due to an increase in electrical and/or mechanical noise, the sensitivity of the first shock detector may be incrementally decreased so as to reduce the number of false shock events detected. In one embodiment, as the sensitivity of the first shock detector is incrementally decreased by a level (e.g., by increasing the first shock threshold 40), there is a corresponding incremental decrease in the sensitivity of the second shock detector (e.g., by increasing the second shock threshold 46). Similarly, when the number of shock events 50 detected by the second shock detector falls below the lower event threshold such that the sensitivity of the first shock detector is incrementally increased (e.g., by decreasing the first shock threshold 40), the sensitivity of the second shock detector is also incrementally increased (e.g., by decreasing the second shock threshold 46).

Figure 3:
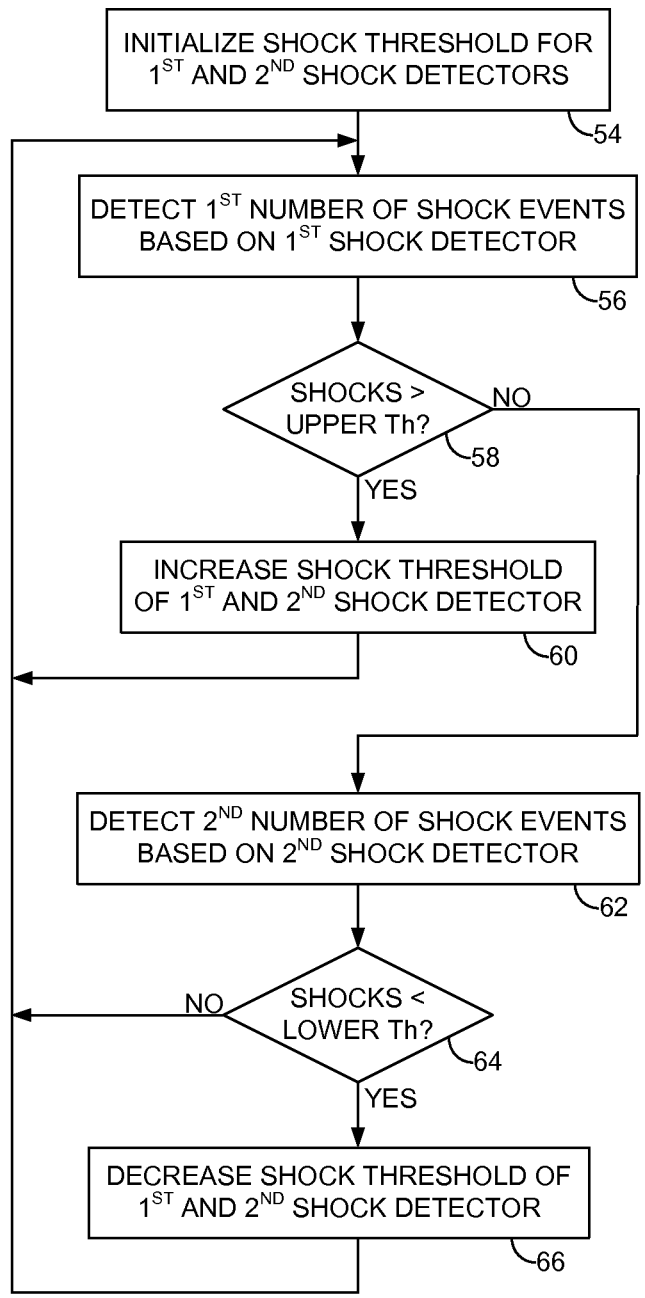
FIG. 3 is a flow diagram according to an embodiment wherein a sensitivity of a first shock detector is increased by decreasing a shock threshold when a number of shock events detected by a second shock detector falls below a lower event threshold.

This embodiment is understood with reference to the flow diagram of FIG. 3, wherein the shock thresholds 40 and 46 for the first and second shock detectors shown in FIG. 2A are initialized (block 54), wherein the second threshold 46 is less than the first shock threshold 40. A first number of shock events is then detected based on the first shock detector (block 56), and when the first number of shock events exceeds the upper event threshold (block 58), the shock threshold for the first and second shock detectors is increased (block 60). The flow diagram is repeated from block 56 until the first number of shock events detected by the first shock detector does not exceed the upper event threshold at block 58. A second number of shock events is then detected based on the second shock detector (block 62), and when the second number of shock events falls below a lower event threshold (block 64), the shock threshold for the first and second shock detectors is decreased (block 66).

Figure 2B:
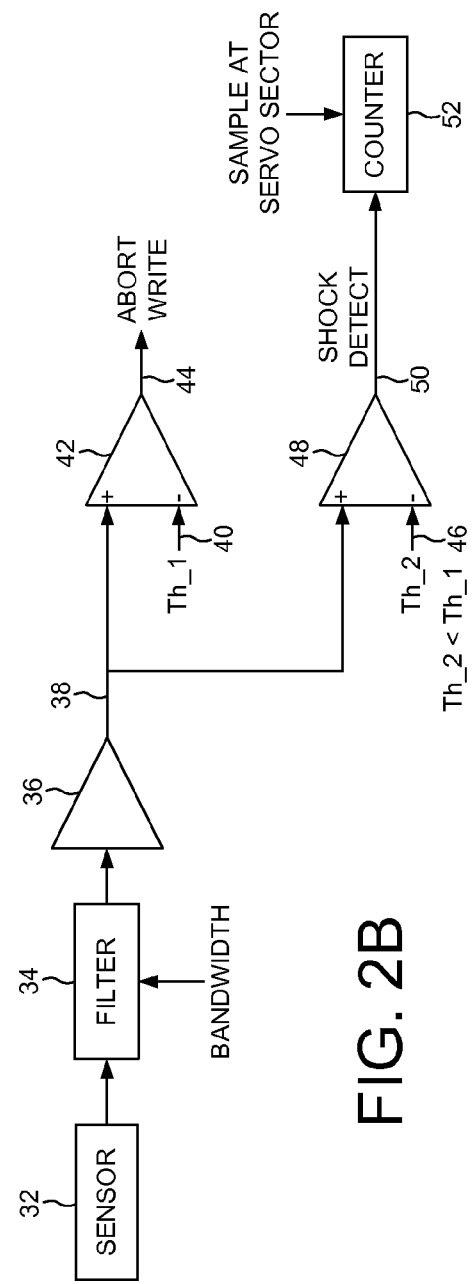
FIG. 2B shows control circuitry for implementing a first shock detector and a second shock detector according to an embodiment.

In one embodiment, the first shock detector detects the shock events 44 at a lower frequency than the second shock detector detects the shock events 50 since the second shock detector operates at a higher sensitivity than the first shock detector. FIG. 2B shows an embodiment wherein the first shock detector is capable of detecting a single shock event 44 between consecutive servo sectors, wherein in one embodiment a write operation is aborted if the shock event 44 is detected. The second shock detector is capable of detecting multiple shock events 50 between consecutive servo sectors, wherein in one embodiment a counter 52 counts the number of shock events 50 between consecutive servo sectors. In one embodiment, the counter 52 is sampled at each servo sector and the number of detected shock events 50 is evaluated to determine when to increase the sensitivity of the first shock detector. For example, the value of the counter 52 after a single servo sector may be compared to a threshold, or the accumulated value of the counter 52 after multiple servo sectors may be compared to a threshold, or the average value of the counter 52 after multiple servo sectors may be compared to a threshold, or any other suitable statistical analysis of the counter 52 may be evaluated to determine when to increase the sensitivity of the first shock detector.

In one embodiment, the amplifier 36 shown in FIG. 2A may be adjusted in order to adjust a gain and thereby adjust the sensitivity of the first and second shock detectors instead of, or in addition to, adjusting the first and second shock thresholds. In one embodiment, a separate amplifier may be employed for adjusting the gain of each shock detector independently (i.e., the amplifier 36 shown in FIG. 2A may be duplicated so that the gain of each shock detector may be adjusted independently).

Figure 4:
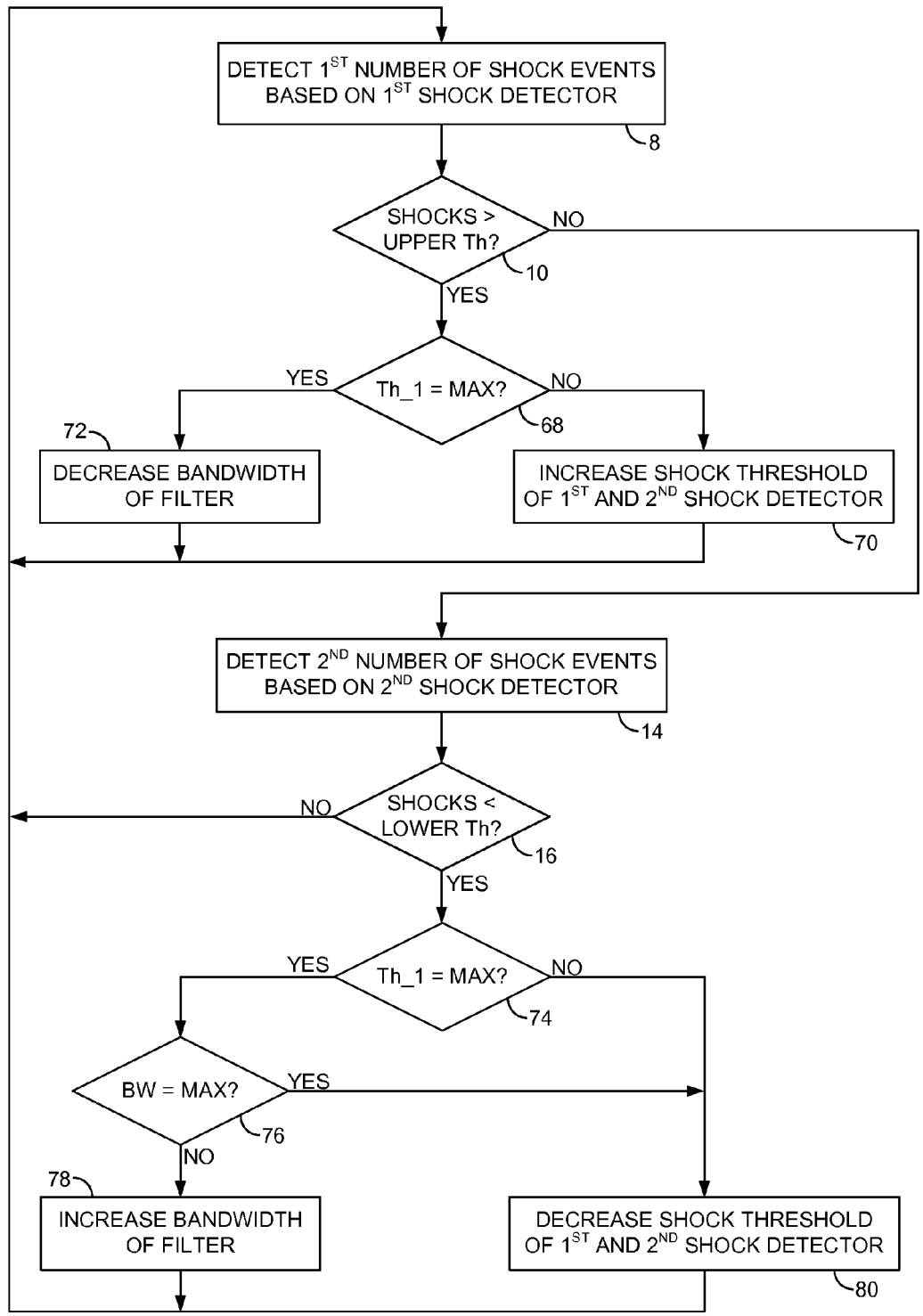
FIG. 4 is a flow diagram according to an embodiment wherein a sensitivity of a first shock detector is adjusted by adjusting a bandwidth of a filter.

In one embodiment, the filter 34 shown in FIG. 2B for filtering the sensor signal comprises a programmable bandwidth which may be configured in order to adjust the sensitivity of the shock detectors. An example of this embodiment is understood with reference to the flow diagram of FIG. 4, which is an extension of the flow diagram of FIG. 1B. When the first number of shock events detected by the first shock detector exceeds the upper event threshold (block 10), the first and second shock thresholds 40 and 46 in FIG. 2B are increased (block 70) in order to decrease the sensitivity of the first and second shock detectors. The flow diagram is repeated from block 8, and when the first shock threshold 40 reaches a maximum (block 68), the bandwidth of the filter 34 in FIG. 2B is decreased (block 72) in order to decrease the sensitivity of the first shock detector. When the second number of shock events falls below the lower event threshold (block 16), and the first shock threshold is a maximum (block 74), and the bandwidth of the filter 34 is not at the maximum (block 76), then the bandwidth of the filter 34 is increased in order to increase the sensitivity of the first and second shock detectors (block 78). If the bandwidth of the filter 34 is at a maximum at block 76, then the first and second shock threshold 40 and 46 in FIG. 2B are decreased in order to increase the sensitivity of the first shock detector (block 80).

In one embodiment, the sensitivity of the first and second shock detectors shown in FIG. 2B may be adjusted by adjusting the bandwidth of the filter 34 independent of the shock thresholds 40 and 46 and/or the gain 36 of the shock detectors. In other embodiments, the bandwidth of the filter 34, the shock thresholds 40 and 46, and/or the gain 36 of the shock detectors may be adjusted in any suitable order (separately or in combination) so as to adjust the sensitivity of the shock detectors as needed.

In the embodiment shown in FIG. 2B, the output of the filter 34 is processed by both the first and second shock detectors. In another embodiment, the filter 34 may be duplicated and the output of each filter processed by the respective shock detectors. In this embodiment, the bandwidth (and/or gain) of each filter may be configured for each shock detector in order to tune the sensitivity of each shock detector separately based on the filter bandwidth, similar to tuning the first and second shock thresholds 40 and 46 shown in FIG. 2B.

In the embodiment of FIGS. 2A and 2B, the first and second shock detectors process a shock signal based on the output of a suitable sensor 42, such as a suitable piezoelectric accelerometer, which may be mounted at any suitable location within the disk drive, such as on the head 4, on the actuator arm 30, or on the disk drive housing. However, the shock signal may be generated in any suitable manner, such as generating a shock signal based on the PES generated from reading the servo sectors $22_0$-$22_N$. In another embodiment, the shock signal may be generated based on a combination of sources, such as combining a shock signal generated using a suitable sensor (e.g., accelerometer) with a shock signal generated based on the PES. In yet another embodiment, the first and second shock detectors may processes different shock signals. For example, the first shock detector may process a shock signal generated by a suitable sensor 32, whereas the second shock detector may process a shock signal based on the PES, or vice versa.

In one embodiment, the disk drive may employ a suitable microactuator (e.g., a piezoelectric element) for actuating the head 4 in fine movements while the VCM 28 actuates the head in coarse movements. The microactuator may actuate the head 4 in any suitable manner, such as by actuating a suspension relative to the actuator arm 30, or actuating the head 4 relative to the suspension. In a disk drive employing multiple disk surfaces having a head actuated over each disk surface, the microactuator of the active head may be used to drive the active head during an access operation, whereas one or more microactuators of the inactive heads may be used to generate a shock signal processed by the first and/or second shock detectors.

Referring again to the embodiment of FIG. 1B, the sensitivity of the first shock detector is adjusted at blocks 12 and 18 based on a number of shock events detected at blocks 10 and 16. In one embodiment, the number of shock events detected is based on a window of time (shock event interval) which may shift in time. In one embodiment, the shock event interval may be based on a number of servo sectors $22_0$-$22_N$ processed. For example, the first number of shock events detected at block 8 may be based on the number of shock events detected while processing the most recent N servo sectors $22_0$-$22_N$, whereas the second number of shock events detected at block 16 may be based on the number of shock events detected while processing the most recent M servo sectors $22_0$-$22_N$ (where N may be equal to or different than M).

In one embodiment, the sensitivity of the first and/or second shock detectors may be adjusted based on the length of the shock event interval. Referring again to FIG. 2A, in one embodiment a write operation may be aborted if a shock event 44 is detected X number of times while processing the most recent N servo sectors $22_0$-$22_N$, where N may be adjusted in order to adjust the sensitivity of the first shock detector. This is similar to evaluating the counter 52 in the embodiment of FIG. 2B after processing the most recent N servo sectors $22_0$-$22_N$, wherein the counter threshold for detecting a shock event may be adjusted in order to adjust the shock detection sensitivity.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk;
   a head actuated over the disk; and
   control circuitry comprising a first shock detector and a second shock detector, the control circuitry operable to:
      detect a first number of shock events based on the first shock detector;
      when the first number of shock events exceeds an upper event threshold, decrease a sensitivity of the first shock detector;
      after decreasing the sensitivity of the first shock detector, detect a second number of shock events based on the second shock detector operating at a higher sensitivity than the first shock detector; and
      when the second number of shock events falls below a lower event threshold, increase the sensitivity of the first shock detector.

2. The disk drive as recited in claim 1, wherein the control circuitry is further operable to adjust the sensitivity of the first shock detector by adjusting a first shock threshold of the first shock detector.

3. The disk drive as recited in claim 1, wherein the control circuitry is further operable to adjust the sensitivity of the first shock detector by adjusting a gain of the first shock detector.

4. The disk drive as recited in claim 1, wherein the control circuitry is further operable to:
   filter a shock signal emanating from a shock sensor to generate a filtered shock signal, wherein the first shock detector is responsive to the filtered shock signal; and
   adjust the sensitivity of the first shock detector by adjusting a bandwidth of the filtering.

5. The disk drive as recited in claim 1, wherein the control circuitry is further operable to:
   when increasing the sensitivity of the first shock detector, increase a sensitivity of the second shock detector; and
   when decreasing the sensitivity of the first shock detector, decrease the sensitivity of the second shock detector.

6. The disk drive as recited in claim 1, wherein the first shock detector detects shock events at a lower frequency than the second shock detector.

7. The disk drive as recited in claim 6, wherein:
   the disk comprises a plurality of servo sectors;
   the first shock detector is capable of detecting a single shock event between consecutive servo sectors; and
   the second shock detector is capable of detecting multiple shock events between consecutive servo sectors.

8. The disk drive as recited in claim 7, wherein the control circuitry is operable to abort a write operation when the first shock detector detects the single shock event.

9. The disk drive as recited in claim 1, wherein the control circuitry is further operable to:
   filter a shock signal emanating from a shock sensor to generate a filtered shock signal, wherein the first shock detector compares the filtered shock signal to a first shock threshold;
   decrease the sensitivity of the first shock detector by increasing the first shock threshold; and
   when the first shock threshold reaches a maximum, decrease the sensitivity of the first shock detector by decreasing a bandwidth of the filtering.

10. The disk drive as recited in claim 1, wherein the control circuitry is operable to abort a write operation based on the first shock detector.

11. A method of operating a disk drive comprising:
    detecting a first number of shock events based on a first shock detector;
    when the first number of shock events exceeds an upper event threshold, decreasing a sensitivity of the first shock detector;
    after decreasing the sensitivity of the first shock detector, detecting a second number of shock events based on a second shock detector operating at a higher sensitivity than the first shock detector; and
    when the second number of shock events falls below a lower event threshold, increasing the sensitivity of the first shock detector.

12. The method as recited in claim 11, further comprising adjusting the sensitivity of the first shock detector by adjusting a first shock threshold of the first shock detector.

13. The method as recited in claim 11, further comprising adjusting the sensitivity of the first shock detector by adjusting a gain of the first shock detector.

14. The method as recited in claim 11, further comprising:
    filtering a shock signal emanating from a shock sensor to generate a filtered shock signal, wherein the first shock detector is responsive to the filtered shock signal; and
    adjusting the sensitivity of the first shock detector by adjusting a bandwidth of the filtering.

15. The method as recited in claim 11, further comprising:
    when increasing the sensitivity of the first shock detector, increasing a sensitivity of the second shock detector; and
    when decreasing the sensitivity of the first shock detector, decreasing the sensitivity of the second shock detector.

16. The method as recited in claim 11, wherein the first shock detector detects shock events at a lower frequency than the second shock detector.

17. The method as recited in claim 16, wherein:
    the disk drive comprises a disk comprising a plurality of servo sectors;
    the first shock detector is capable of detecting a single shock event between consecutive servo sectors; and
    the second shock detector is capable of detecting multiple shock events between consecutive servo sectors.

18. The method as recited in claim 17, further comprising aborting a write operation when the first shock detector detects the single shock event.

19. The method as recited in claim 11, further comprising:
    filtering a shock signal emanating from a shock sensor to generate a filtered shock signal, wherein the first shock detector compares the filtered shock signal to a first shock threshold;
    decreasing the sensitivity of the first shock detector by increasing the first shock threshold; and
    when the first shock threshold reaches a maximum, decrease the sensitivity of the first shock detector by decreasing a bandwidth of the filtering.

20. The method as recited in claim 11, further comprising aborting a write operation to a disk based on the first shock detector.

* * * * *